(12) United States Patent
Kim

(10) Patent No.: US 12,449,804 B2
(45) Date of Patent: Oct. 21, 2025

(54) AUTONOMOUS VEHICLE, CONTROL METHOD FOR REMOTELY CONTROLLING THEREOF

(71) Applicants: HYUNDAI MOTOR COMPANY, Seoul (KR); Kia Corporation, Seoul (KR)

(72) Inventor: Dong Gyu Kim, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 289 days.

(21) Appl. No.: 17/875,014

(22) Filed: Jul. 27, 2022

(65) Prior Publication Data

US 2023/0251647 A1 Aug. 10, 2023

(30) Foreign Application Priority Data

Feb. 4, 2022 (KR) .................. 10-2022-0015025

(51) Int. Cl.
*G05D 1/00* (2024.01)
*B60W 60/00* (2020.01)

(52) U.S. Cl.
CPC ......... *G05D 1/0011* (2013.01); *B60W 60/001* (2020.02); *B60W 2520/04* (2013.01); *B60W 2556/40* (2020.02); *B60W 2556/45* (2020.02)

(58) Field of Classification Search
CPC .............. G05D 1/0011; B60W 60/001; B60W 2520/04; B60W 2556/40; B60W 2556/45
See application file for complete search history.

(56) References Cited

U.S. PATENT DOCUMENTS

| 11,499,834 | B2* | 11/2022 | Shapira | G01C 21/32 |
| 12,093,031 | B2* | 9/2024 | Choi | G05D 1/0011 |
| 2008/0027591 | A1* | 1/2008 | Lenser | G05D 1/0038 701/28 |
| 2012/0323483 | A1* | 12/2012 | Mutoh | G01C 21/3446 701/410 |

(Continued)

FOREIGN PATENT DOCUMENTS

| CN | 112734341 A | * | 4/2021 | |
| CN | 113126618 A | * | 7/2021 | G05D 1/0221 |

(Continued)

OTHER PUBLICATIONS

"Bjornberg, A; Shared Control for Vehicle Teleoperation with a Virtual Environment Interface; 2020; Degree Project in the Field of Technology Engineering Physics and the Main Field of Study" (Year: 2020).*

*Primary Examiner* — Ramya P Burgess
*Assistant Examiner* — Christopher R Cardimino
(74) *Attorney, Agent, or Firm* — MORGAN, LEWIS & BOCKIUS LLP

(57) ABSTRACT

The present disclosure relates to an autonomous vehicle and a remote control method therefor. An exemplary embodiment of the present disclosure provides an autonomous vehicle, including a processor configured to transmit a vehicle path to the control system to request remote control when the remote control of the autonomous vehicle is required, to receive a corrected path obtained by correcting the vehicle from the control system, and to determine errors in reference point coordinates and path data of the corrected path.

17 Claims, 16 Drawing Sheets

(56) References Cited

U.S. PATENT DOCUMENTS

| | | | |
|---|---|---|---|
| 2014/0229101 A1* | 8/2014 | Glaser | G01C 21/34 |
| | | | 701/538 |
| 2016/0223355 A1* | 8/2016 | Habib | G01C 21/3492 |
| 2016/0378111 A1* | 12/2016 | Lenser | G05D 1/0297 |
| | | | 701/2 |
| 2019/0063927 A1* | 2/2019 | Laur | G01C 21/38 |
| 2019/0265050 A1* | 8/2019 | Fujimoto | G01C 21/3889 |
| 2020/0249031 A1 | 8/2020 | Ewert | |
| 2021/0155267 A1 | 5/2021 | Goto et al. | |
| 2021/0179140 A1* | 6/2021 | Zhu | G08G 1/096725 |
| 2022/0009552 A1 | 1/2022 | Sakai et al. | |
| 2022/0081001 A1* | 3/2022 | Xia | B60W 60/0016 |
| 2023/0192134 A1* | 6/2023 | Winter | G08G 1/0969 |
| | | | 701/23 |

FOREIGN PATENT DOCUMENTS

| | | | |
|---|---|---|---|
| JP | 2007-322312 A | | 12/2007 |
| JP | 2015-206757 A | | 11/2015 |
| JP | 2018-045500 A | | 3/2018 |
| KR | 20190083268 A | * | 7/2019 |
| WO | 2020/066069 A1 | | 4/2020 |

* cited by examiner

AUTONOMOUS VEHICLE, CONTROL METHOD FOR REMOTELY CONTROLLING THEREOF

CROSS-REFERENCE TO RELATED APPLICATION

This application claims priority to and benefits of Korean Patent Application No. 10-2022-0015025, filed in the Korean Intellectual Property Office on Feb. 4, 2022, the entire contents of which are incorporated herein by reference.

TECHNICAL FIELD

The present disclosure relates to an autonomous vehicle and a remote control method therefor, and more particularly, to a technique for managing a corrected path for remote control in a remote control situation of the autonomous vehicle.

BACKGROUND

As an electronic technique of a vehicle develops, an interest in an autonomous vehicle that drives to a destination by recognizing a driving environment of the vehicle itself without manipulation of a driver is growing more and more.

An autonomous vehicle refers to a vehicle capable of operating by itself without manipulation of a driver or an occupant.

While driving in an autonomous driving mode, there may be a situation in which it is impossible to follow a driving path to the destination normally although there is no abnormality in a function of the vehicle. As such, when a situation where it is impossible to follow a path occurs during autonomous driving, it is often difficult to follow the driving path, such as when the driver directly intervenes in control of the vehicle or when the driver's intervention is difficult, the vehicle stops.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

An exemplary embodiment of the present disclosure has been made in an effort to provide an autonomous vehicle and a remote control method therefor, capable of minimizing errors by matching a corrected path with a precision map coordinate system of a vehicle path generated by the vehicle, thereby preventing a vehicle accident when the vehicle receives the corrected path from the control system due to a situation requiring remote control during autonomous driving.

The technical objects of the present disclosure are not limited to the objects mentioned above, and other technical objects not mentioned can be clearly understood by those skilled in the art from the description of the claims.

An exemplary embodiment of the present disclosure provides an autonomous vehicle, including a processor configured to transmit a vehicle path to the control system to request remote control when the remote control of the autonomous vehicle is required, and to receive a corrected path obtained by correcting the vehicle path from the control system, to determine errors in reference point coordinates and path data of the corrected path.

In an exemplary embodiment, the processor may compare the reference point coordinates of the corrected path with reference point coordinates of a precision map of a current position of the autonomous vehicle.

In an exemplary embodiment, the processor may compare reference data, which is a previous path, with reference data of the vehicle path at the current position of the corrected path.

In an exemplary embodiment, when the reference point coordinates of the corrected path and the reference point coordinates of the precision map of the current position of the autonomous vehicle do not match, or when the reference data of the vehicle path and the reference data, which is the previous path, do not match at the current position of the corrected path, the processor may double-transform the reference point coordinates of the corrected path into a precision map-based coordinate system.

In an exemplary embodiment, the processor may perform double transformation by transforming the reference point coordinates of the corrected path into a global coordinate system and then re-transforming it back into a current precision map coordinate system of the autonomous vehicle.

In an exemplary embodiment, when the reference point coordinates of the corrected path and the reference point coordinates of the precision map of the current position of the autonomous vehicle match, or when the reference data of the vehicle path and the reference data, which is the previous path, match at the current position of the corrected path, the processor may determine whether the corrected path is drivable.

In an exemplary embodiment, the processor may determine whether driving of the corrected path is possible based on road information of the corrected path and vehicle surrounding information.

In an exemplary embodiment, the reference data of the vehicle path and reference data of the corrected path each includes a number of path points that is predetermined without a change in positions of the path points as path information before a current position of the autonomous vehicle, and the vehicle path and the corrected path each may include a plurality of operator data capable of adjusting the positions of the path points in the control system as path information after the current position of the autonomous vehicle.

In an exemplary embodiment, the processor may determine whether a distance error occurs by comparing a distance between coordinate points of each of the path points of the vehicle path and coordinate points of each of the path points of the corrected path based on indexes of the path points of the vehicle path and the corrected path.

In an exemplary embodiment, the processor may compare a distance between coordinate points of each path point of the reference data of the vehicle path and coordinate points of each path point of the reference data of the corrected path, to determine whether the reference data of the corrected path matches the reference data of the vehicle path.

In an exemplary embodiment, after the double transformation, when the reference point coordinates of the corrected path and the reference point coordinates of the precision map of the current position of the autonomous vehicle do not match, or when the reference data of the vehicle path and the reference data, which is the previous path, do not match at the current position of the corrected path, the processor may request corrected path retransmission from the control system.

In an exemplary embodiment, the processor may notify the control system that driving of the corrected path is possible when it is determined that the driving of the corrected path is possible, and may receive a final driving signal from the control system.

In an exemplary embodiment, when receiving the final driving signal from the control system, the processor may determine whether the autonomous vehicle is stopped, and may control the autonomous vehicle to travel on the drivable corrected path when the autonomous vehicle is in a stopped state.

In an exemplary embodiment, when the autonomous vehicle is in a drivable state, the processor may update a current position and a precision map of the autonomous vehicle, may compare the reference point coordinates of the corrected path received together with the final driving signal from the control system and the reference point coordinates of the precision map of the current position of the autonomous vehicle, and may compare reference data, which is a previous path, with reference data of the vehicle path at the current position of the corrected path.

In an exemplary embodiment, depending on whether the reference point coordinates of the corrected path received together with the final driving signal from the control system match the reference point coordinates of the precision map of the current position of the autonomous vehicle and whether the reference data of the vehicle path and the reference data, which is the previous path, match at the current position of the corrected path, the processor may double-transform the reference point coordinates of the corrected path into a precision map-based coordinate system or controls the autonomous vehicle to follow the corrected path.

In an exemplary embodiment, it may further include: a communication device configured to communicate with the control system; and
a storage configured to store the corrected path received from the control system.

In an exemplary embodiment, the processor may generate the vehicle path based on a precision map coordinate system, and may transmit the vehicle path and precision map-based reference point coordinates together when requesting the control system to perform remote control through the communication device.

In an exemplary embodiment, the processor may receive a corrected path that is corrected based on a same coordinate system as a precision map-based coordinate system of the autonomous vehicle from the control system through the communication device, and may also receive reference point coordinates of the precision map of the corrected path.

An exemplary embodiment of the present disclosure provides a remote control method for an autonomous vehicle, including: requesting by a processor, remote control by transmitting a vehicle path to a control system when the remote control of the autonomous vehicle is required; receiving a corrected path obtained by correcting the vehicle path from the control system; and determining errors in reference point coordinates and path data of the corrected path.

In an exemplary embodiment, the determining of the errors in the reference point coordinates and the path data of the corrected path may include: comparing the reference point coordinates of the corrected path with reference point coordinates of a precision map of a current position of the autonomous vehicle; and comparing reference data, which is a previous path, with reference data of the vehicle path at the current position of the corrected path.

According to the present technique, errors may be minimized by matching a corrected path with a precision map coordinate system of a vehicle path generated by the autonomous vehicle, thereby preventing a vehicle accident when the autonomous vehicle receives the corrected path from the control system due to a situation requiring remote control during autonomous driving, thereby improving commercialization of autonomous driving by securing reliability for remote control.

In addition, various effects that can be directly or indirectly identified through this document may be provided.

DETAILED DESCRIPTION OF THE EMBODIMENTS

Figure 1:
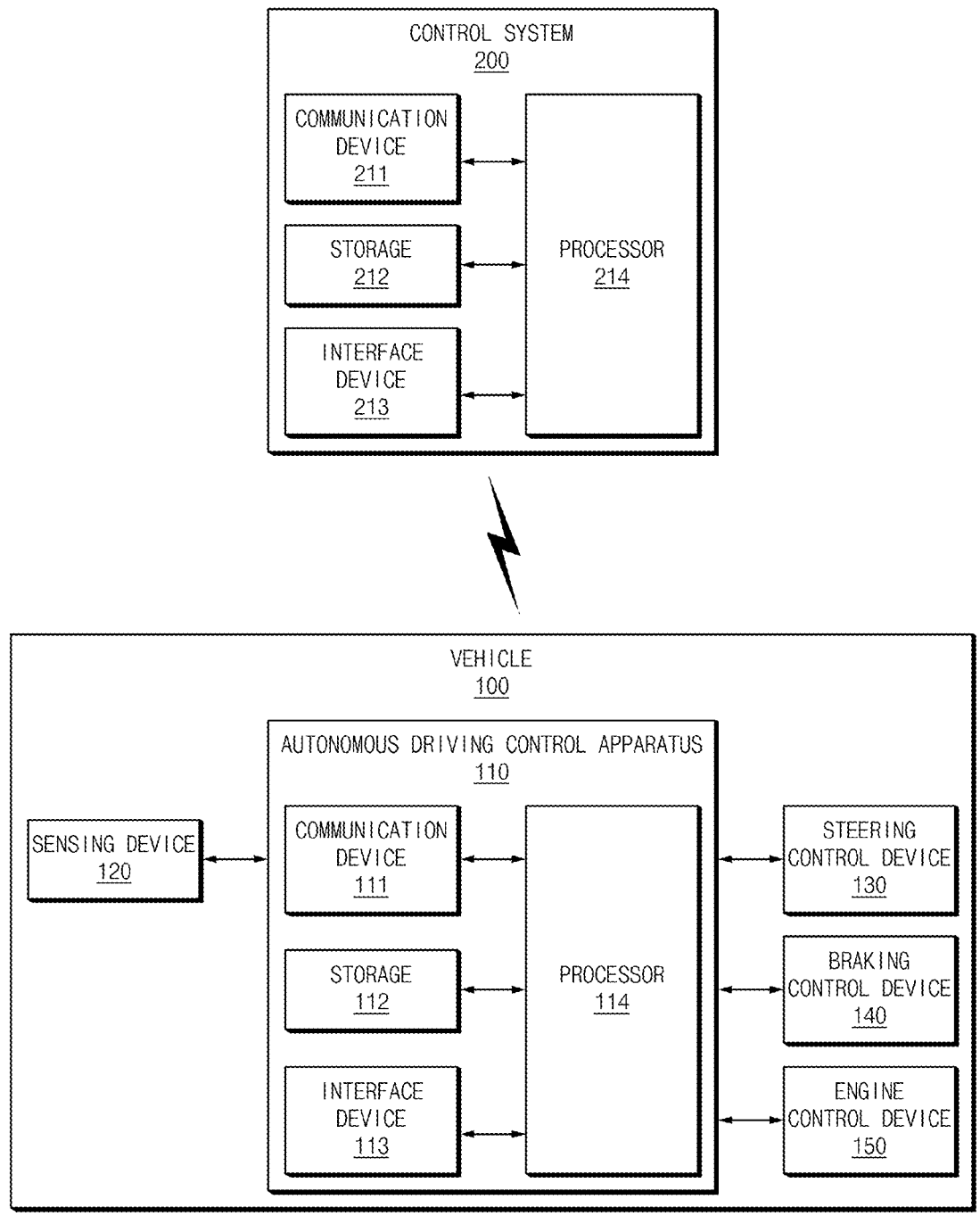
FIG. 1 illustrates a block diagram showing a configuration of a remote control system for an autonomous apparatus according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 10.

FIG. 1 illustrates a block diagram showing a configuration of a remote control system for an autonomous apparatus according to an exemplary embodiment of the present disclosure.

Referring to FIG. 1, the remote control system for an autonomous vehicle according to an exemplary embodiment of the present disclosure includes a vehicle 100 and a control system 200, and remote control may be performed through communication between the vehicle 100 and the control system 200. In this case, the vehicle 100 may include an autonomous vehicle.

The vehicle 100 may include an autonomous driving control apparatus 110, a sensing device 120, a steering control device 130, a braking control device 140, and an engine control device 150.

The autonomous driving control apparatus 110 according to the exemplary embodiment of the present disclosure may be implemented inside the vehicle. In this case, the autonomous driving control apparatus 110 may be integrally formed with internal control units of the vehicle, or may be implemented as a separate device to be connected to control units of the vehicle by a separate connection means.

In a situation (a situation in which autonomous driving is not possible) where remote control of the autonomous vehicle required, the autonomous driving control apparatus 110 activates a remote control function and requests the control system 200 to perform remote control.

The autonomous driving control apparatus 110 may transmit vehicle position information (e.g., vehicle coordinates), vehicle surrounding information (e.g., obstacle information), and a vehicle path (e.g., a path from a departure point to a destination, etc.) when requesting the control system 200 to perform the remote control. In this case, the vehicle path is generated based on a precision map coordinate system (e.g., ENU coordinate system). In this case, the corrected path received from the control system 200 is also a corrected path based on a same basis as the precision map coordinate system of the vehicle.

The autonomous driving control apparatus 110 may determine errors in reference point coordinates and path data of the corrected path from the control system 200, and may control it to follow the error-free corrected path.

Referring to FIG. 1, the autonomous driving control apparatus 110 may include a communication device 111, a storage 112, an interface device 113, and a processor 114.

The communication device 111 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like.

In addition, the communication device 111 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), Ethernet communication, etc. In addition, short-range communication technique may include bluetooth, ZigBee, ultra wideband (UWB), radio frequency identification (RFID), infrared data association (IrDA), and the like. For example, the communication device 111 may perform wireless communication with the control system 200, may transmit vehicle position information (e.g., vehicle coordinates), vehicle surrounding information (e.g., obstacle information), a remote control request, a vehicle path, reference point coordinates based on a precision map, etc. to the control system 200, and may receive a corrected path, reference point coordinates based on a precision map of the corrected path, etc. from the control system 200.

The storage 112 may store sensing results of the sensing device 120, information received from the control system 200, data and/or algorithms required for the processor 114 to operate, and the like.

As an example, the storage 112 may store vehicle surrounding information (image data captured through a camera), a vehicle path (travel path from origin to destination), a corrected path received from the control system 200, coordinates of a reference point of the corrected path, a remote control command, and the like.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input means for receiving a control command from a user and an output means for outputting an operation state of the autonomous driving control apparatus 110 and results thereof. Herein, the input means may include a key button, and may further include a mouse, a keyboard, a touch screen, a microphone, a joystick, a jog shuttle, a stylus pen, and the like. In addition, the input means may further include a soft key implemented on the display.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), or a 3D display.

As an example, the interface device 113 may be implemented as a head-up display (HUD), a cluster, an audio video navigation (AVN), a human machine interface (HM), a user setting menu (USM), or the like.

For example, the interface device 113 may display the corrected path received from the control system 200, the vehicle path generated by the vehicle, and the like. The interface device 113 may receive information from a driver, and for this purpose, a mouse, a keyboard, a touch screen, and a microphone may be provided.

The processor 114 may be electrically connected to the communication device 111, the storage 112, the interface device 113, and the like, may electrically control each component, and may be an electrical circuit that executes software commands, thereby performing various data processing and calculations described below.

The processor 114 may process a signal transferred between components of the autonomous driving control apparatus 110, and may perform overall control such that each of the components can perform its function normally.

The processor 114 may be implemented in the form of hardware, software, or a combination of hardware and software, or may be implemented as microprocessor, and may be, e.g., an electronic control unit (ECU), a micro controller unit (MCU), or other subcontrollers mounted in the vehicle.

The processor 114 may generate a path for autonomous driving based on a precision map. In this case, the processor 114 may generate a vehicle path based on a precision map by using various coordinate systems such as an ENU, a WGS (LLA), and an UTM, and may receive a corrected path of a same coordinate system from the control system 200. However, in the case of receiving the corrected path from the control system 200, the corrected path may be re-requested to the control system 200 by recognizing a case where reference point coordinates do not match due to movement of the vehicle, or some data in the corrected path is lost due to a communication problem, etc. when receiving the corrected path from the control system 200.

The processor 114 may determine a situation in which remote control of the autonomous vehicle is required. That is, the processor 114 may determine that a situation in which the vehicle 100 cannot travel on an existing vehicle path (autonomous driving path) is a situation requiring remote control, due to driving conditions, emergency situations, obstacles in the vehicle path, etc., and may request the control system 200 to perform the remote control.

The processor 114 may transmit information for remote control when the remote control is requested to the control system 200. In this case, the information may include vehicle path (based on a ENU coordinate system), vehicle position information (e.g., vehicle coordinates), vehicle surrounding information (e.g., obstacles, moving vehicle information, stationary vehicle information, stationary objects), map information, etc.

When the remote control of the autonomous vehicle is required, the processor 114 may transmit a vehicle path to the control system 200 to request the remote control, and may receive the corrected path obtained by correcting the vehicle from the control system 200, to determine errors in reference point coordinates and path data of the corrected path. The processor 114 may receive the corrected path and a remote control command for remote control from the control system 200, and may compare reference data and reference point coordinates based on coordinate systems of the corrected path and the vehicle path generated by the vehicle.

That is, the processor 114 may compare reference point coordinates of the corrected path with reference point coordinates of a precision map of a current position of the vehicle, and may compare reference data of the vehicle path with the reference data which is a previous path at a current position of the corrected path.

The processor 114 may double-transform the reference point coordinates of the corrected path into a precision map-based coordinate system when the reference point coordinates of the corrected path and the reference point coordinates of the precision map of the current position of the vehicle do not match, or when the reference data of the vehicle path and the reference data which is the previous path do not match at the current position of the corrected path. That is, the processor 114 may perform double transformation by transforming the reference point coordinates of the corrected path into a global coordinate system and then re-transforming it back into a current precision map coordinate system of the vehicle.

The processor 114 may determine whether the corrected path is drivable when the reference point coordinates of the corrected path and the reference point coordinates of the precision map of the current position of the vehicle match, or when the reference data of the vehicle path and the reference data which is the previous path match at the current position of the corrected path. That is, the processor 114 may determine whether driving of the corrected path is possible based on road information of the corrected path and vehicle surrounding information.

In this case, the vehicle path and the corrected path each may include reference data in which a number of path points is predetermined without a change in positions of the path points as path information before a current position of the vehicle, and a plurality of operator data capable of adjusting the positions of the path points in a control system as path information after the current position of the vehicle.

The processor 114 may determine whether a distance error occurs by comparing a distance between the coordinate points of each of the path points of the vehicle path and the coordinate points of each of the path points of the corrected path based on indexes of the path points of the vehicle path and the corrected path.

The processor 114 determine whether the reference data of the corrected path matches the reference data of the vehicle path by comparing a distance between coordinate points of each of the path points of the reference data of the vehicle path and coordinate points of each of the path points of the reference data of the corrected path. Thereafter, after the double transformation, the processor 114 may request retransmission of the corrected path from the control system 200 when the reference point coordinates of the corrected path and the reference point coordinates of the precision map of the current position of the vehicle do not match, or when the reference data of the vehicle path and the reference data which is the previous path do not match at the current position of the corrected path.

When it is determined that the driving of the corrected path is possible, the processor 114 may receive a final driving signal from the control system 200 by notifying the control system that the driving of the corrected path is possible.

In addition, when receiving the final driving signal from the control system 200, the processor 114 may determine whether the vehicle is stopped and, when the vehicle is in a stopped state, may control the vehicle to travel on a drivable corrected path. In this case, when the vehicle is in a driving state, the processor 114 may update the current position and the precision map of the vehicle, because the reference point coordinates and the path data may change due to the driving of the vehicle, may compare the reference point coordinates of the corrected path received together with a final driving signal from the control system 200 and the reference point coordinates of the precision map of the current position of the vehicle, and may compare the reference data of the vehicle path with the reference data of the previous path at the current position of the corrected path again.

The processor 114 may double-transform the reference point coordinates of the corrected path into a precision map-based coordinate system or may control the vehicle to follow the corrected path depending on whether the reference point coordinates of the corrected path received together with the final driving signal from the control system 200 match the reference point coordinates of the precision map of the current position of the vehicle and whether the reference data of the vehicle path and the reference data which is the previous path match at the current position of the corrected path.

The processor 114 may generates a vehicle path based on the precision map coordinate system, and when requesting the control system to perform remote control through the communication device, may transmit the vehicle path and precision map-based reference point coordinates together. That is, the processor 114 may generate a driving path by using a precision map based on an ENU coordinate system, and the control system 200 may also correct the driving path based on the ENU coordinate system.

The processor 114 may receive a corrected path that is corrected based on a same coordinate system as a precision map-based coordinate system of the vehicle from the control system 200 through the communication device, and in this case, may also receive reference point coordinates of the precision map of the corrected path.

The sensing device 120 may include one or more sensors that sense an obstacle (e.g., a preceding vehicle or a rear vehicle) positioned around the vehicle, and measure a distance with the obstacle, a relative speed thereof, and/or steering thereof.

The sensing device 120 may include a plurality of sensors to sense an external object of the vehicle, to obtain information related to a position of the external object, a speed of the external object, a moving direction of the external object, and/or a type of the external object (e.g., vehicles, pedestrians, bicycles or motorcycles, etc.). To this end, the sensing device 120 may include an ultrasonic sensor, a radar, a camera, a laser scanner, and/or a corner radar, a lidar, an acceleration sensor, a yaw rate sensor, a torque measurement sensor and/or a wheel speed sensor, a steering angle sensor, etc.

In addition, the vehicle 100 may further include a GPS (global positioning system) receiving device, an inertial measurement unit (IMU), and the like in addition to the sensing device 120.

The steering control device 130 may be configured to control a steering angle of a vehicle, and may include a steering wheel, an actuator interlocked with the steering wheel, and a controller controlling the actuator.

The braking control device 140 may be configured to control braking of the vehicle, and may include a controller that controls a brake thereof.

The engine control device 150 may be configured to control engine driving of a vehicle, and may include a controller that controls a speed of the vehicle.

When receiving a vehicle path together with a remote control request from the autonomous vehicle 100, the control system 200 corrects the vehicle path to transmit it to the vehicle 100.

In this case, the control system 200 may correct the vehicle path based on the coordinate system of the precision map received from the vehicle 100 based on the coordinate system of the precision map, and may correct the vehicle path for the vehicle to avoid obstacles and the like based on vehicle surrounding information.

The control system 200 transmits the corrected vehicle path and reference point coordinates to the vehicle 100.

The control system 200 may include a communication device 211, a storage 212, an interface device 213, and a processor 214.

The communication device 211 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like.

In addition, the communication device 211 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), etc. In addition, short-range communication technique may include bluetooth, ZigBee, ultra wideband (UWB), radio frequency identification (RFID), infrared data association (IrDA), and the like. For example, the communication device 211 may perform wireless communication with the vehicle 100, may receive a remote control request and a vehicle path from the vehicle 100, and may transmit a corrected path and a remote control command (e.g., a request for determining drivability of the corrected path, and driving on the corrected path) to the vehicle 100.

The storage 212 may store information received from the vehicle 100, and data and/or algorithm required for the processor 214 to operate, and the like.

As an example, the storage 212 may store vehicle surrounding information, a vehicle path, etc. received from the vehicle 100.

The storage 212 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 213 may include an input means capable of receiving a control command from an operator and an output means for outputting an operation state of the control system 200 and results thereof. Herein, the input means may include a key button, and may further include a mouse, a keyboard, a touch screen, a microphone, a joystick, a jog shuttle, a stylus pen, and the like. In addition, the input means may further include a soft key implemented on the display. For example, the interface device 213 may display map information in which a vehicle path, vehicle surrounding information, a current position of the vehicle, surrounding object information, etc. received from the vehicle 100 are marked. For example, the interface device 213 may include all communication terminals such as a personal computer (PC), a notebook computer, a smartphone, a tablet PC, a pad, a personal digital assistant (PDA), and a wearable device.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 214 may be electrically connected to the communication device 211, the storage 212, the interface device 213, and the like, may electrically control each component, and may be an electrical circuit that executes software commands, thereby performing various data processing and calculations described below.

The processor 214 may process a signal transferred between components of the control system 200, and may perform overall control such that each of the components can perform its function normally. The processor 214 may be implemented in the form of hardware, software, or a combination of hardware and software, or may be implemented as microprocessor.

When receiving a remote control request and a vehicle path from the autonomous vehicle 100, the processor 214 may correct the vehicle path to generate a corrected path, and may transmit the corrected path to the vehicle 100. In this case, the processor 214 may correct the vehicle path based on a same coordinate system as a precision map-based coordinate system of the vehicle 100, to transmit it to the vehicle 100.

Figure 2A:
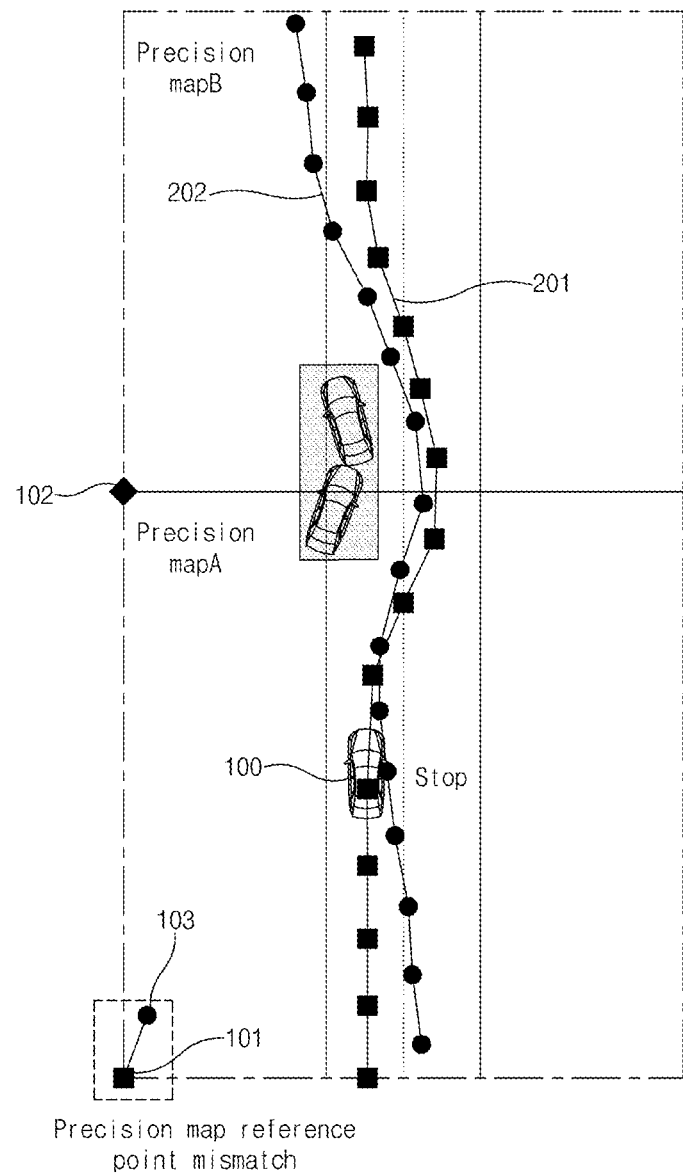
FIG. 2A illustrates a view for describing an example of a case in which reference point coordinates of a vehicle path and a corrected path do not match according to an exemplary embodiment of the present disclosure.
Figure 2B:
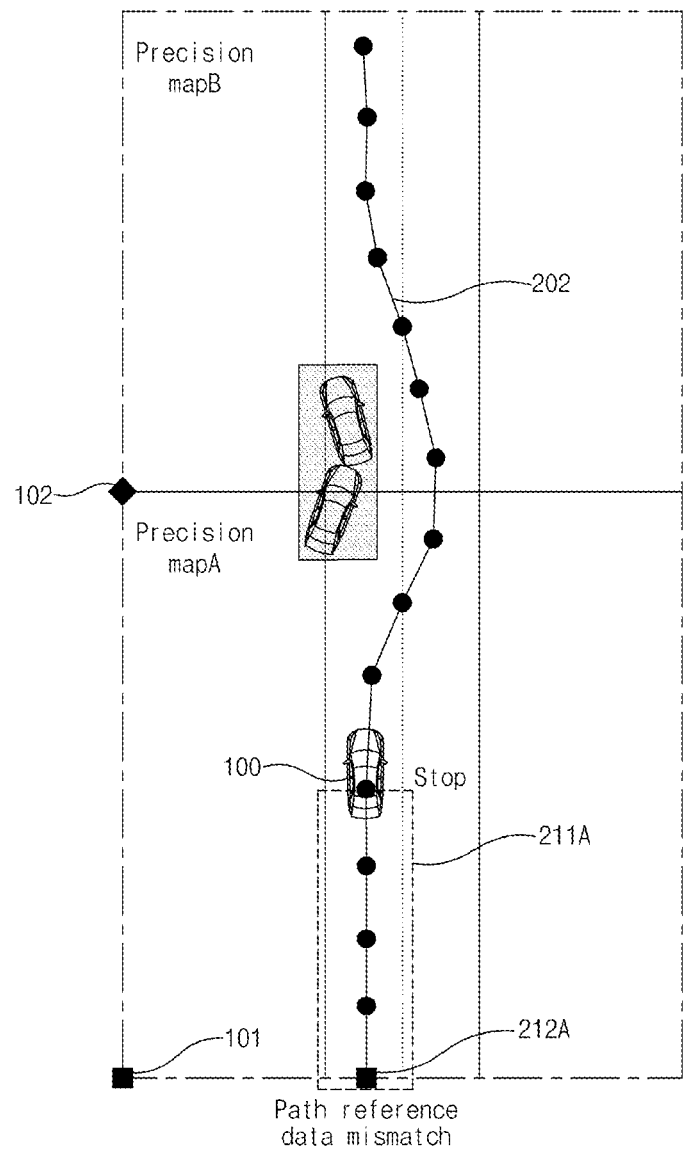
FIG. 2B illustrates a view for describing an example of a case in which path data of a vehicle path and a corrected path do not match according to an exemplary embodiment of the present disclosure.

FIG. 2A illustrates a view for describing an example of a case in which reference point coordinates of a vehicle path and a corrected path do not match according to an exemplary embodiment of the present disclosure, and FIG. 2B illustrates a view for describing an example of a case in which path data of a vehicle path and a corrected path do not match according to an exemplary embodiment of the present disclosure.

Referring to FIG. 2A, when it is difficult to continue autonomous driving because an accident occurs in the front while the vehicle 100 is autonomously driving on a vehicle path 201, remote control is requested to the control system 200 in a state where the vehicle 100 is stopped in a precision map area A.

Accordingly, the vehicle 100 compares reference point coordinates 103 of the corrected path received from the control system 200 with reference point coordinates 101 of a precision map A of the vehicle path. FIG. 2A illustrates a case where the reference point coordinates 103 of the corrected path and the reference point coordinates 101 of the precision map A of the vehicle path do not match. In this case, precision map zones for each position may be different, and in the present disclosure, a precision map A and a precision map B will be described separately. In addition, the precision map A and the precision map B have different positions with reference point coordinates 101 and 102.

As illustrated in FIG. 2A, the vehicle 100 may request retransmission of the corrected path to the control system 200 when a distance error occurs between the reference point coordinates 103 and the reference point coordinates 101 of the precision map A of the vehicle path.

Referring to FIG. 2B, an example of comparing reference data of a vehicle path and a corrected path is disclosed. In this case, reference data 211A refers to path data before the current position of the vehicle (previous path in which the vehicle has already been driven). FIG. 2B illustrates a case where a vehicle path 201 and a corrected path 202 match, but one of path points 212A of reference data of the corrected path 202 is lost.

As such, when one of the path data of the reference data is lost and the reference data of the vehicle path and the corrected path do not match, the autonomous driving control apparatus 110 of the vehicle 100 transforms the corrected path received from the control system 200 into a precision map coordinate system of the vehicle.

Thereafter, the autonomous driving control apparatus 110 of the vehicle 100 compares the reference point coordinates and reference data of the vehicle path 201 and the corrected path 202 again, and when they do not match, notifies the control system 200 of inconsistency to receive a new corrected path.

In addition, the autonomous driving control apparatus 110 of the vehicle 100 determines whether driving of the corrected path is possible when the reference point coordinates and the reference data of the vehicle path 201 and the corrected path 202 all match. In this case, the autonomous driving control apparatus 110 of the vehicle 100 may determine whether the driving of the corrected path is possible based on road situations and surrounding situations of the corrected path.

When the driving is possible, the autonomous driving control apparatus 110 of vehicle 100 notifies the control system 200 that the driving is possible, and when receiving a final driving command for the corrected path from the control system 200, controls the vehicle 100 to follow the corrected path.

Figure 3A:
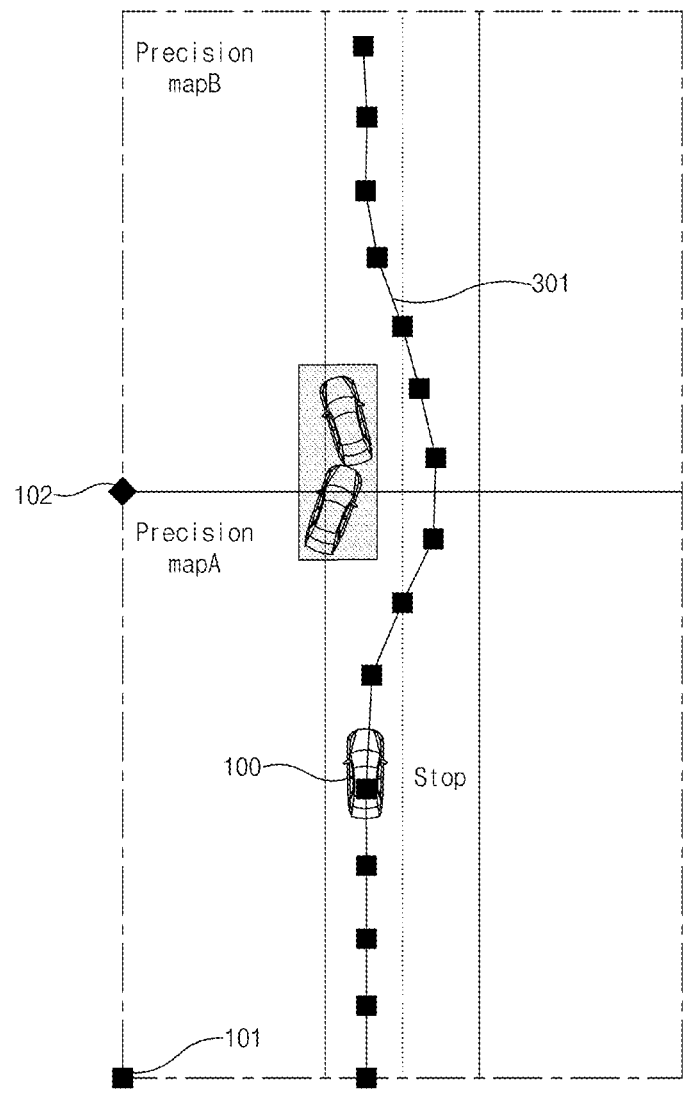
FIG. 3A and FIG. 3B each illustrates a view for describing an example of a case in which reference point coordinates and path data of a vehicle path and a corrected path do not match due to vehicle movement according to an exemplary embodiment of the present disclosure.
Figure 3B:
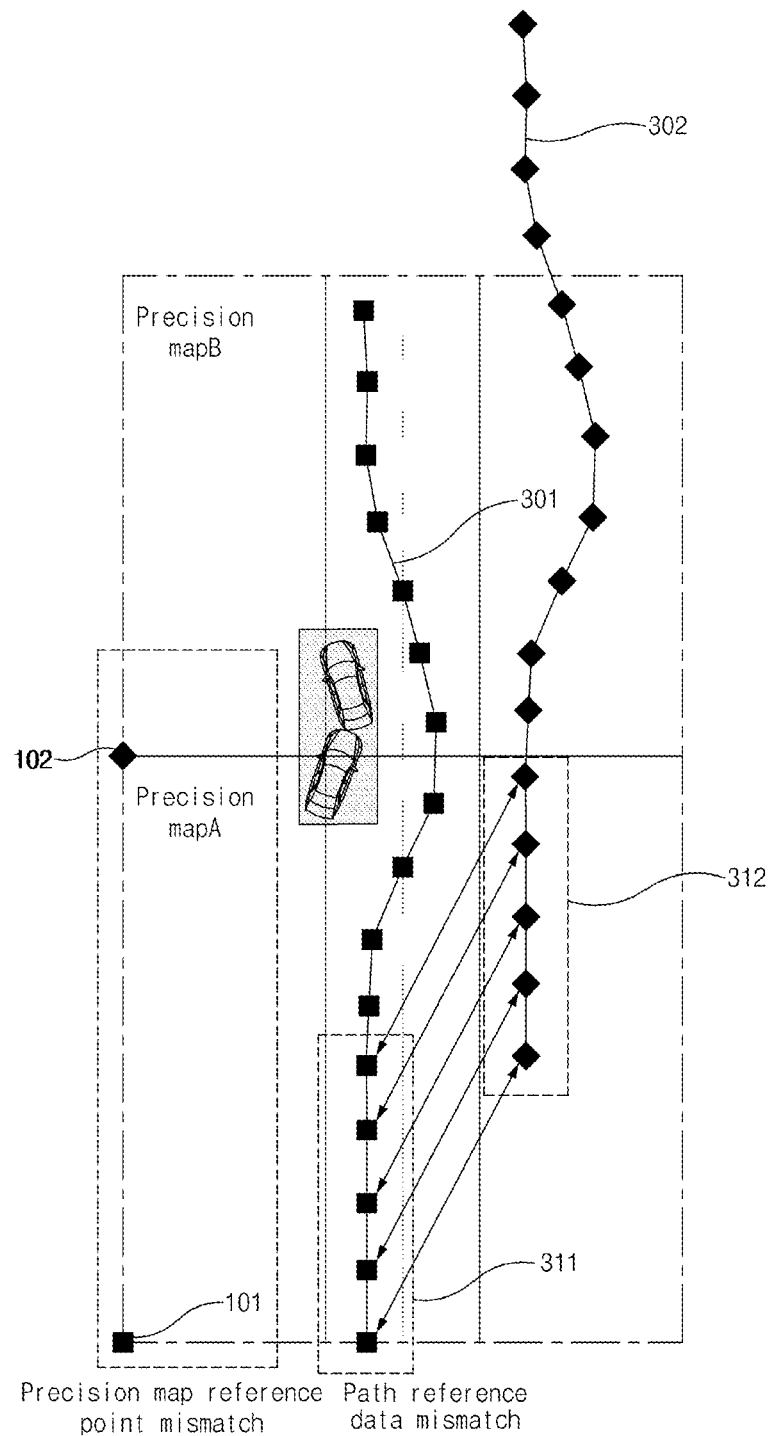

FIG. 3A and FIG. 3B each illustrates a view for describing an example of a case in which reference point coordinates and path data of a vehicle path and a corrected path do not match due to vehicle movement according to an exemplary embodiment of the present disclosure.

Referring to FIG. 3A, an example in which the autonomous driving control apparatus 110 of the vehicle 100 receives the final driving command for the corrected path 301 received from the control system 200, and follows the corrected path is illustrated.

Referring to FIG. 3B, a case in which a change occurs in a precision map zone as the vehicle 100 starts driving so that a position of vehicle 100 changes is illustrated. That is, as the vehicle 100 moves from a zone of the precision map A to a zone of the precision map B, a discrepancy between the reference point coordinates and the reference data may occur.

That is, the reference point coordinates are changed from the reference point coordinates 101 of the precision map A to the reference point coordinates 102 of the precision map B due to the movement of the vehicle 100.

In addition, it can be seen that, due to the movement of the vehicle 100, a distance error occurs between reference data 311 of the path 302 in which the vehicle is traveling and reference data 312 of the path 302 newly received from the control system 200.

In this case, a number of path points of the reference data may be adjusted.

Figure 4:
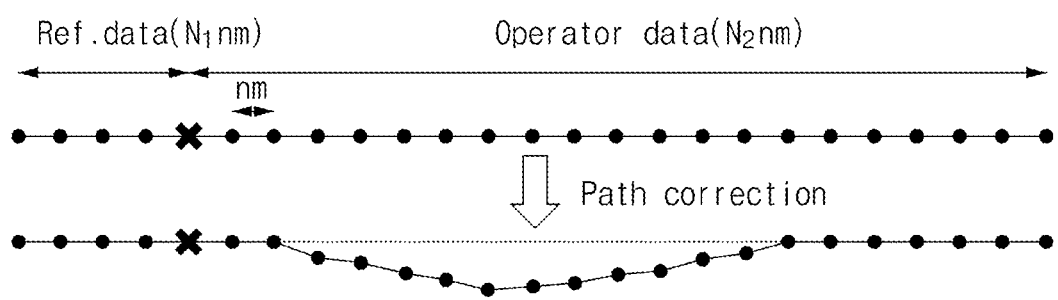
FIG. 4 illustrates a view for describing an example of a configuration of path data for correcting a remote control path according to an exemplary embodiment of the present disclosure.

FIG. 4 illustrates a view for describing an example of a configuration of path data for correcting a remote control path according to an exemplary embodiment of the present disclosure.

Referring to FIG. 4, a data configuration of each of the corrected path and the vehicle path may include reference data configured with N1 predefined points and operator data configured with N2 points that are adjustable in the control system 200. In this case, the reference data is a value that is not corrected, and the operator data is corrected. In FIG. 4, N1 indicates 5 points, N2 indicates 20 points, and a distance between each point is 5 m.

Figure 5:
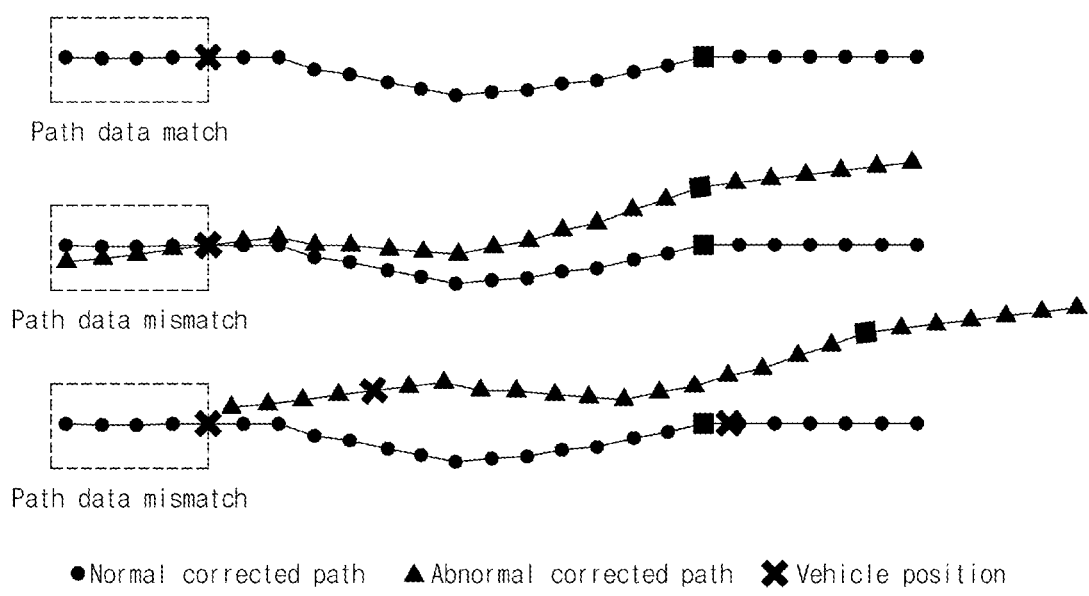
FIG. 5 illustrates a view for describing a comparison process of reference data of a corrected path according to an exemplary embodiment of the present disclosure.

FIG. 5 illustrates a view for describing a comparison process of reference data of a corrected path according to an exemplary embodiment of the present disclosure.

Case 1 indicates a case where the reference data of the corrected path and the reference data of the vehicle path match.

Cases 2 and 3 indicate cases where the reference data of the corrected path and the reference data of the vehicle path do not match.

The autonomous driving control apparatus 110 of the vehicle 100 may compare a distance between coordinate points based on an index of the path arrangement.

That is, the autonomous driving control apparatus 110 of the vehicle 100 may compare whether a distance error occurs between a coordinate value of an $m^{th}$ path point of the corrected path and a coordinate value of an $m^{th}$ path point of the reference data of the vehicle path ($1 \leq m \leq N_1$), to determine whether the reference data of the corrected path matches the reference data of the vehicle path.

Figure 6A:
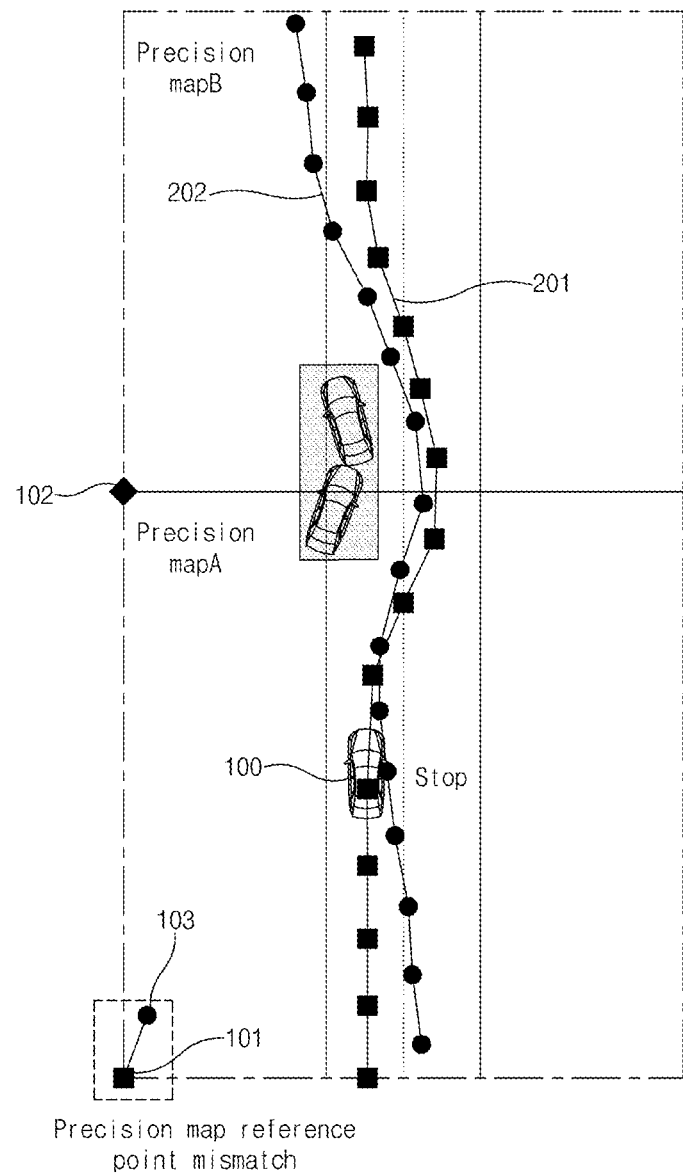
FIG. 6A and FIG. 6B illustrate views for describing a process of determining whether coordinates of a precision map reference point match or not according to an exemplary embodiment of the present disclosure.
Figure 6B:
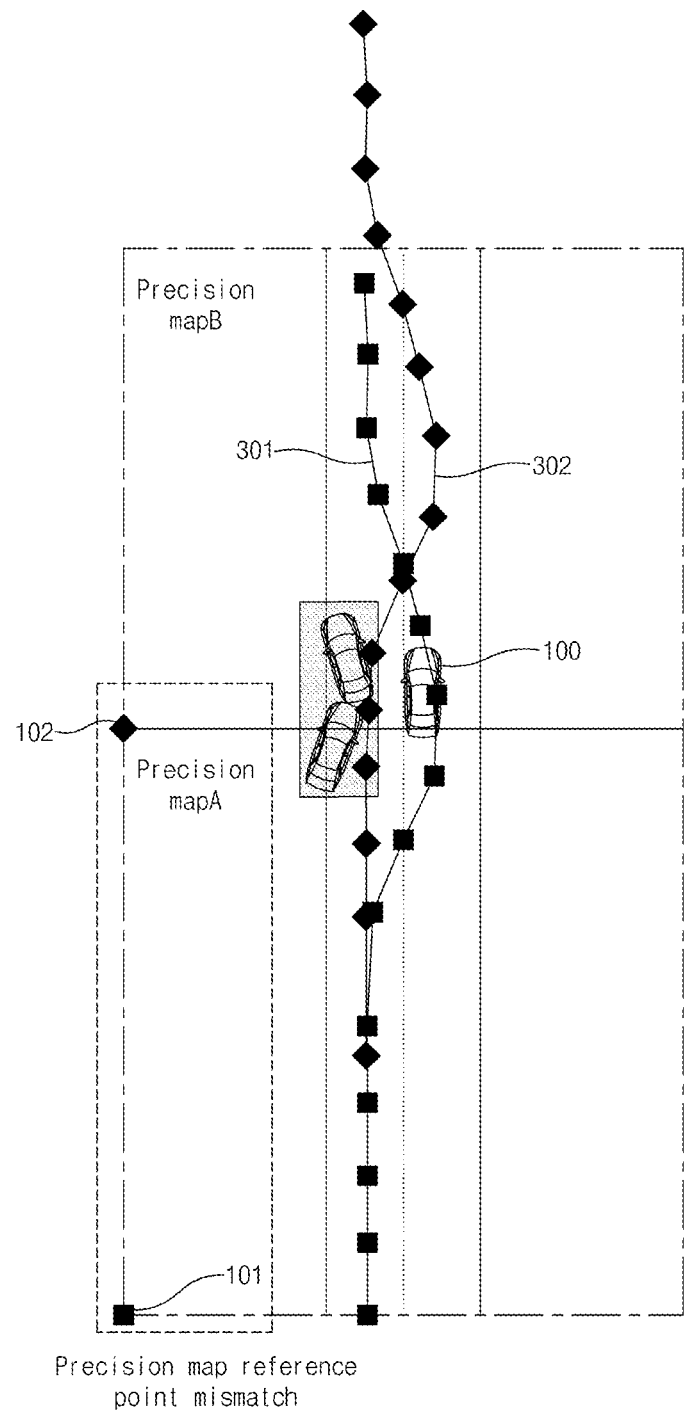

FIG. 6A and FIG. 6B illustrate views for describing a process of determining whether coordinates of a precision map reference point match or not according to an exemplary embodiment of the present disclosure.

Referring to FIG. 6A, a case in which reference point coordinates of the precision map A on which the vehicle is currently positioned and reference point coordinates of the corrected path 202 do not match is disclosed.

Referring to FIG. 6B, a case where, as the vehicle 100 moves, a precision map zone of a same coordinate system changes, and reference point coordinates of the precision map B of the current position of the vehicle 100 and the reference point coordinates of the corrected path 202 do not match is disclosed.

Figure 7A:
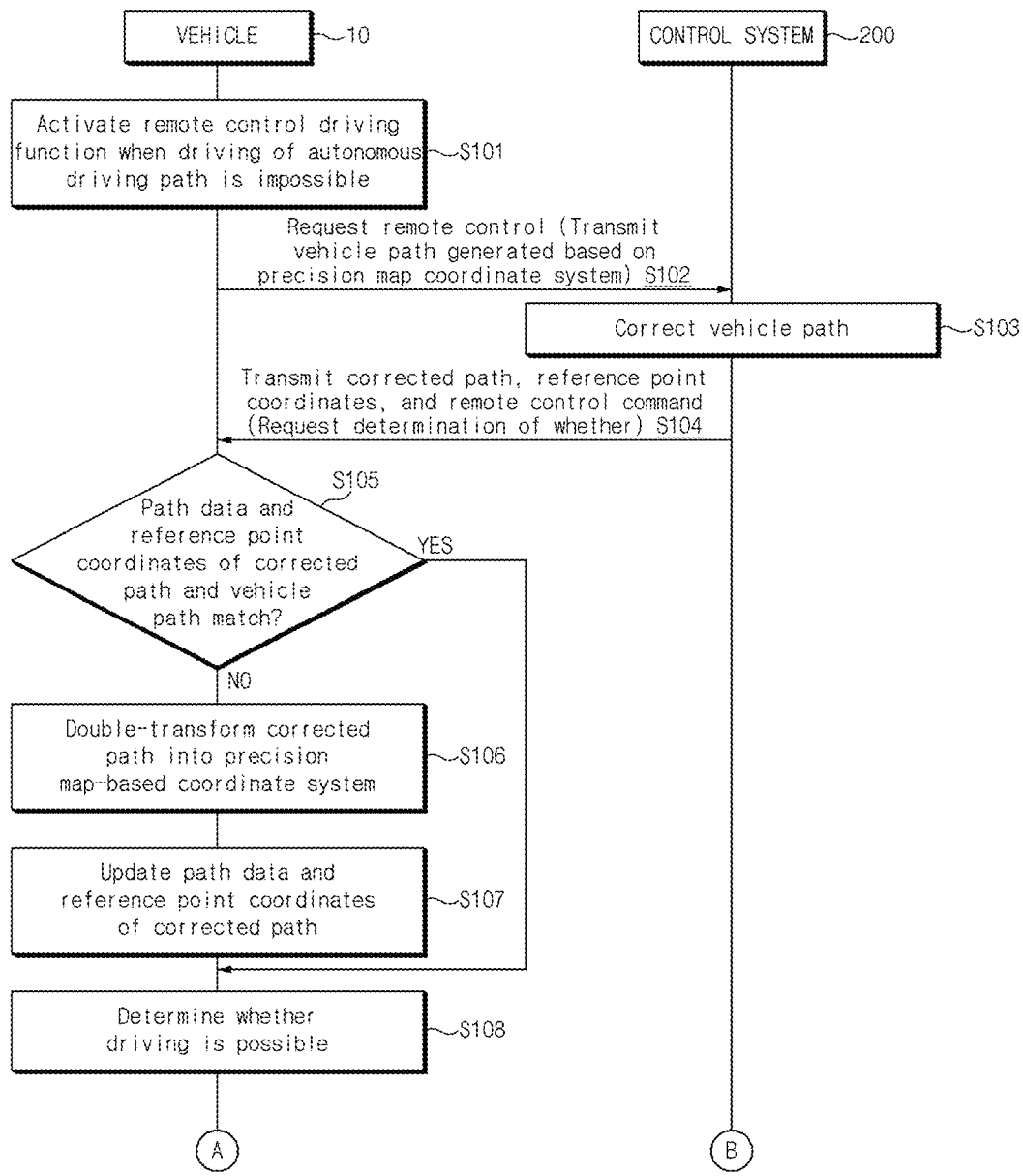
FIG. 7A and FIG. 7B illustrate a flowchart showing a remote control method for an autonomous vehicle according to an exemplary embodiment of the present disclosure.
Figure 7B:
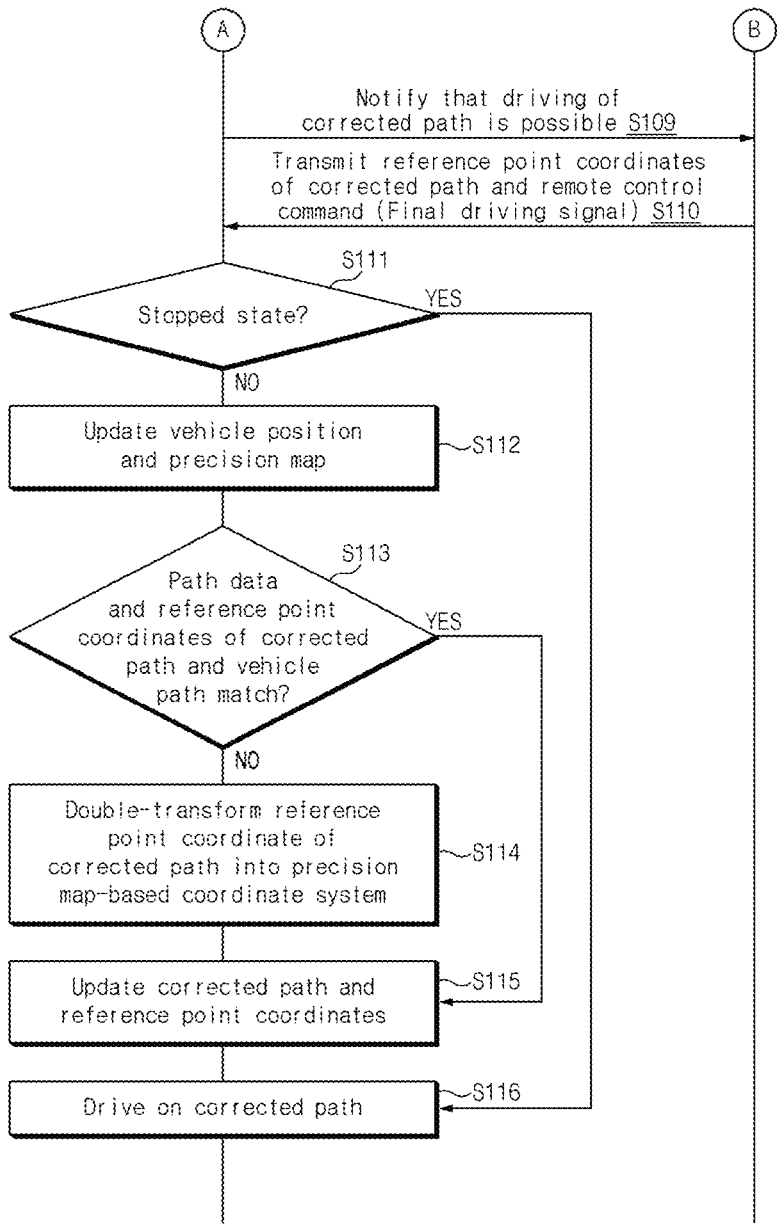

Hereinafter, a remote control method for an autonomous vehicle according to an exemplary embodiment of the present disclosure will be described in detail with reference to FIG. 7A and FIG. 7B. FIG. 7A and 7B illustrate a flowchart showing a remote control method for an autonomous vehicle according to an exemplary embodiment of the present disclosure.

Hereinafter, it is assumed that the autonomous driving control apparatus 110 of the vehicle 100 of FIG. 1 and the control system 200 perform processes of FIG. 7A and FIG. 7B. In addition, in the description of FIG. 7A and FIG. 7B, it may be understood that operations described as being performed by each system are controlled by a processor of each of the systems.

Referring to FIG. 7A and FIG. 7B, the vehicle 100 determines whether driving of a current path is impossible due to an external environment during autonomous driving, and when the driving of the current path is impossible, activates a remote control driving function (S101) and requests the control system 200 to perform remote control (S102). In this case, the vehicle 100 transmits a vehicle path and vehicle surrounding information generated based on a precision map coordinate system to the control system 200. That is, data transmitted from the vehicle 100 to the control system 200 includes path data of an ENU coordinate system (2D form) and reference point coordinates of a WGS84 coordinate system (spherical form) of a precision map zone based on a position of the current vehicle.

Accordingly, the control system 200 corrects the vehicle path based on the precision map coordinate system received from the vehicle 100 (S103). The control system 200 may correct the vehicle path based on vehicle surrounding information received from the vehicle 100 or information collected from an external server or other vehicles.

The control system 200 corrects the path by using a same coordinate system as data received from the vehicle 100, and transmits the reference point coordinates together with the corrected path to the vehicle 100 (S104).

Accordingly, the vehicle 100 compares whether the reference point coordinates of the precision map based on the current position match the reference point coordinates of the precision map received from the control system 200 (S105).

When the reference point coordinates of the precision map based on the current position do not match the reference point coordinates of the precision map received from the control system 200, the vehicle 100 double-transforms the corrected path into the precision map-based coordinate system (S106). That is, the vehicle 100 transforms the reference point coordinates of the corrected path into a global coordinate system (reference), and re-transforms the reference point coordinates transformed to the global coordinate system into a current precision map coordinate system of the vehicle 100, to perform a process of unifying it with a local coordinate system of the vehicle.

The vehicle 100 updates the path data and the reference point coordinates of the transformed corrected path (S107), and determines whether the transformed corrected path is drivable by using vehicle surrounding information or road information (S108).

When the transformed corrected path is drivable, the vehicle 100 notifies the control system 200 that the corrected path is drivable (S109), and transmits the reference point coordinates of the corrected path and the final driving signal to travel on the corrected path determined to be drivable (S110).

When receiving the final driving signal from the control system 200, the vehicle 100 determines whether the vehicle 100 is currently in a stopped state (S111), and when it is in the stopped state, is controlled to travel on the corrected path received from the control system 200.

On the other hand, when the vehicle 100 is not in the stopped state, that is, in a driving state, the vehicle 100 updates the current position and the precision map of the vehicle (S112), and determines whether the path data and the reference point coordinates of the corrected path match the path data and the reference point coordinates of the vehicle path (S113). When the path data and the reference point coordinates of the corrected path match the path data and the reference point coordinates of the vehicle path, the vehicle 100 updates the corrected path and the reference point coordinates (S115), and continues driving on the updated corrected path (S116).

On the other hand, when the path data and the reference point coordinates of the corrected path does not match the path data and the reference point coordinates of the vehicle path, the vehicle 100 double-transforms the reference point coordinates of the corrected path into a precision map-based coordinate system (S114). That is, the vehicle 100 transforms the reference point coordinates of the corrected path into a global coordinate system (reference), and re-transforms the reference point coordinates transformed to the global coordinate system into a current precision map coordinate system of the vehicle, to unify it with a local coordinate system of the vehicle 100.

Thereafter, the vehicle 100 updates the corrected path and the reference point coordinates (S115), and continues driving on the updated corrected path (S116).

Figure 8A:
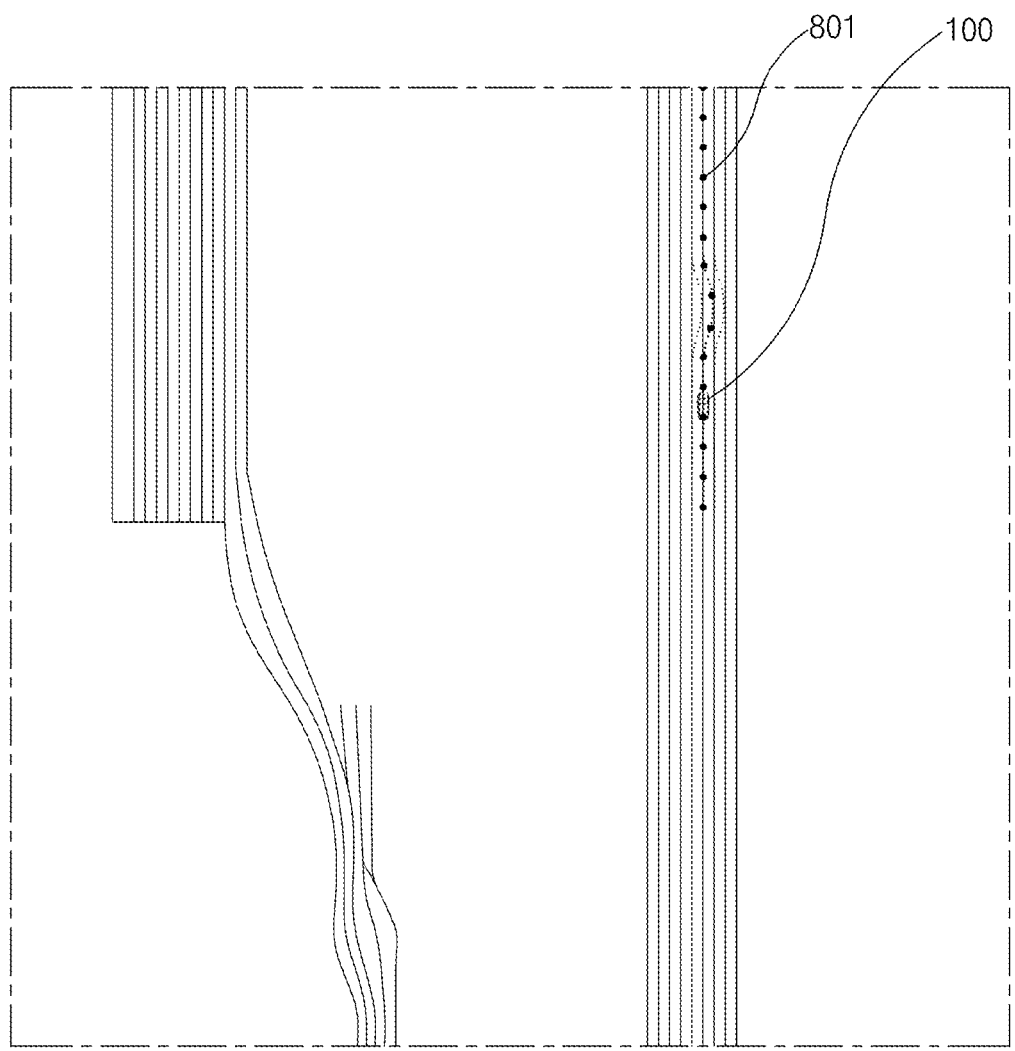
FIG. 8A and FIG. 8B illustrate views for describing a phenomenon of deviation of a corrected path due to a mismatch of reference point coordinates according to an exemplary embodiment of the present disclosure.
Figure 8B:
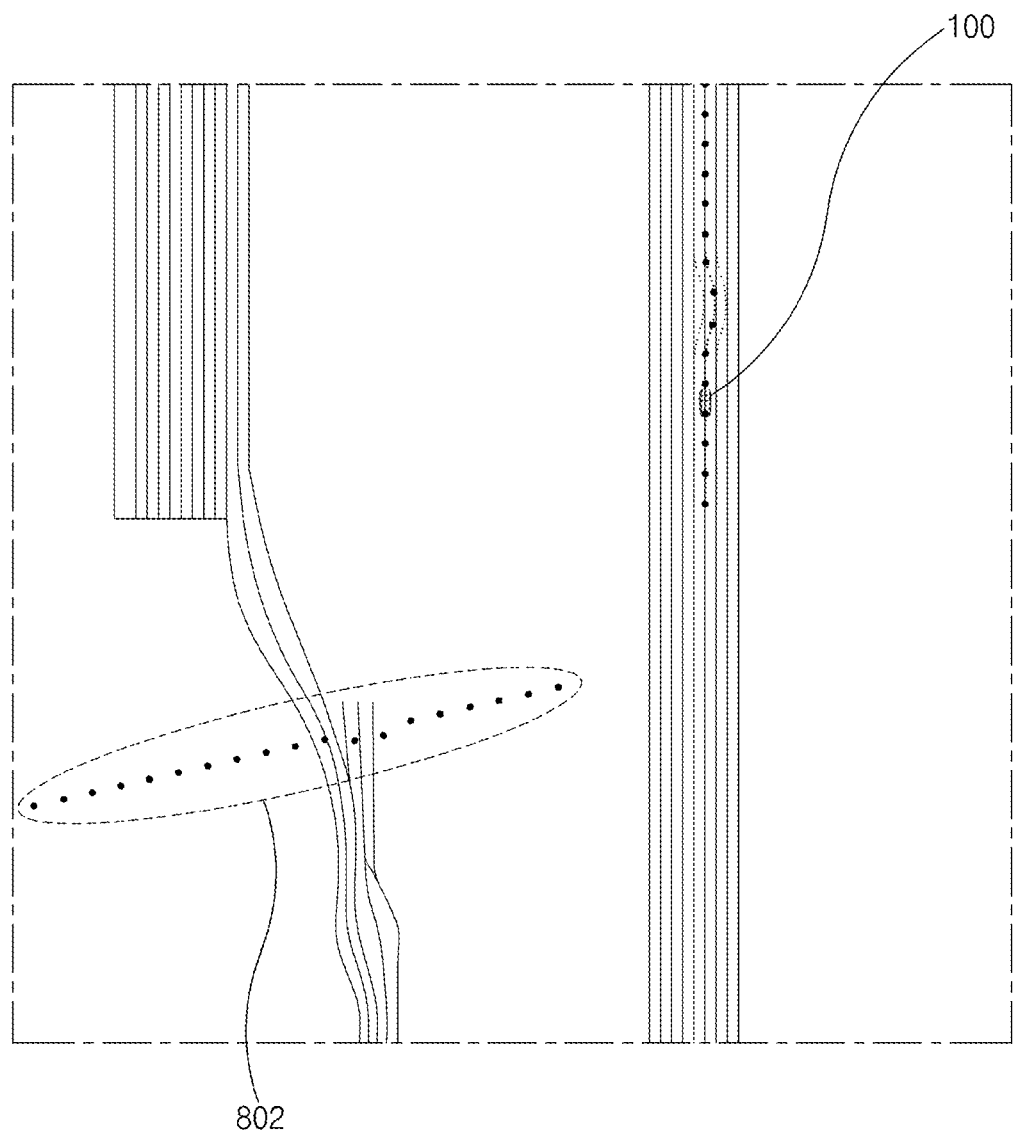
Figure 9A:
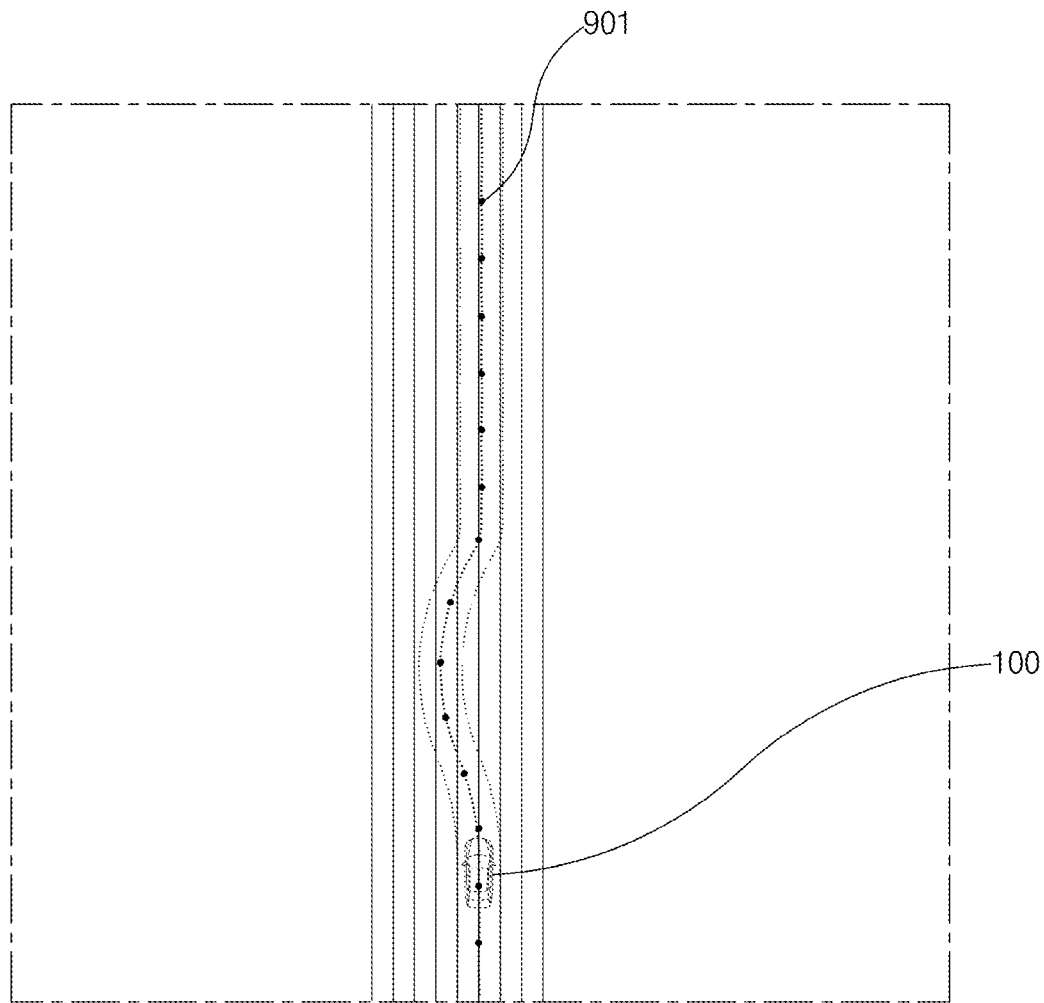
FIG. 9A and FIG. 9B each illustrates a view for describing an example of a case in which reference point coordinates of a vehicle path and a corrected path do not match according to an exemplary embodiment of the present disclosure.
Figure 9B:
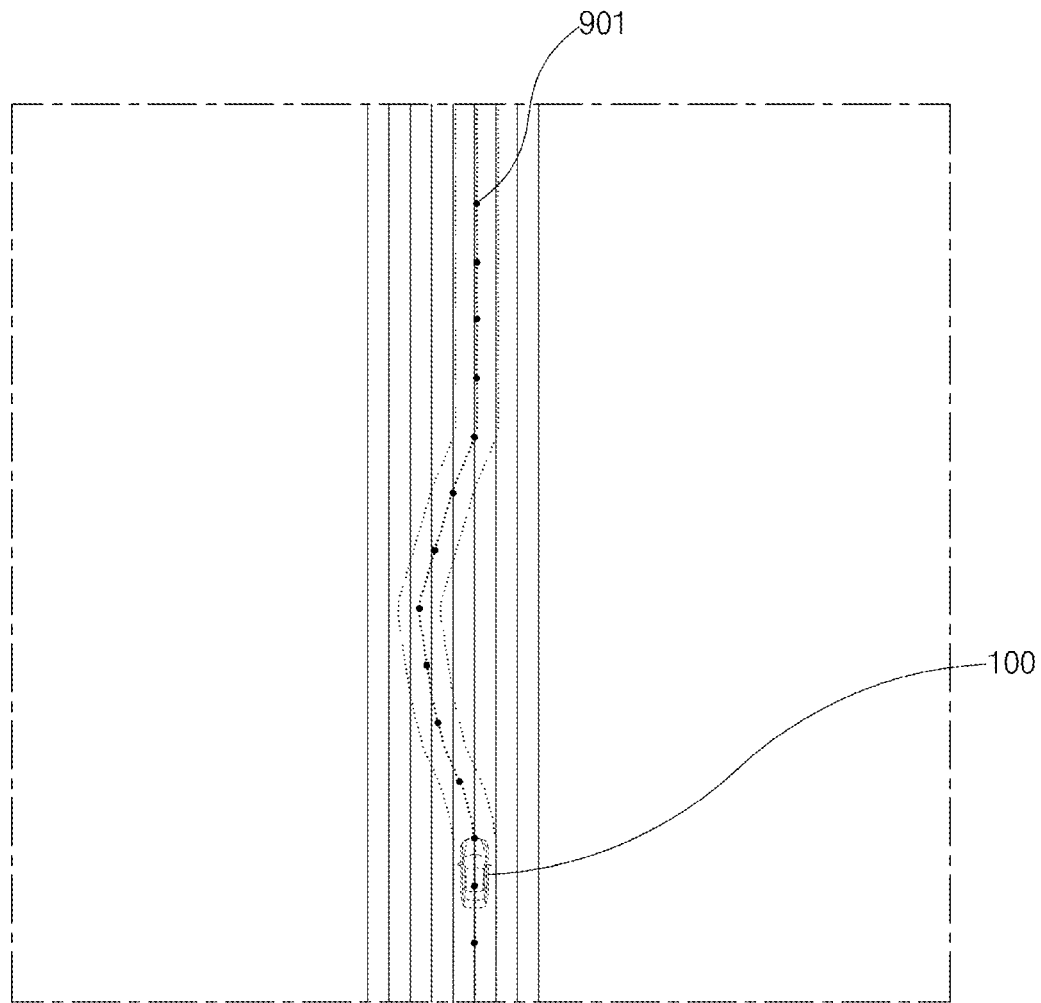

FIG. 8A and FIG. 8B illustrate views for describing a phenomenon of deviation of a corrected path due to a mismatch of reference point coordinates according to an exemplary embodiment of the present disclosure, and FIG. 9A and FIG. 9B each illustrate a view for describing an example of a case in which reference point coordinates of a vehicle path and a corrected path do not match according to an exemplary embodiment of the present disclosure.

FIG. 8A illustrates a vehicle path 801, and FIG. 8B illustrates a deviation of a corrected path 802 due to a mismatch of reference point coordinates in a corrected path having different reference point coordinates from those of the vehicle path.

FIG. 9A indicates a vehicle path 901, and FIG. 9B illustrates an example of a corrected path 902 in the case of matching the reference point coordinates and the reference data.

As such, according to the present disclosure, when a corrected path is received from the control system 200 in the event of a situation requiring remote control while the vehicle is autonomously driving, errors may be minimized by matching precision map coordinate systems of the corrected path and the vehicle path generated by the vehicle. That is, according to the present disclosure, when the vehicle 100 receives the corrected path from the control system 200, it is possible to accurately reflect the corrected path to enable autonomous driving to continue by re-requesting the corrected path to the control system 200 by recognizing a case where some data of the corrected path is lost, etc. due to a problem that the reference point coordinates do not match, or a communication problem when the corrected path is received from the control system 200.

Figure 10:
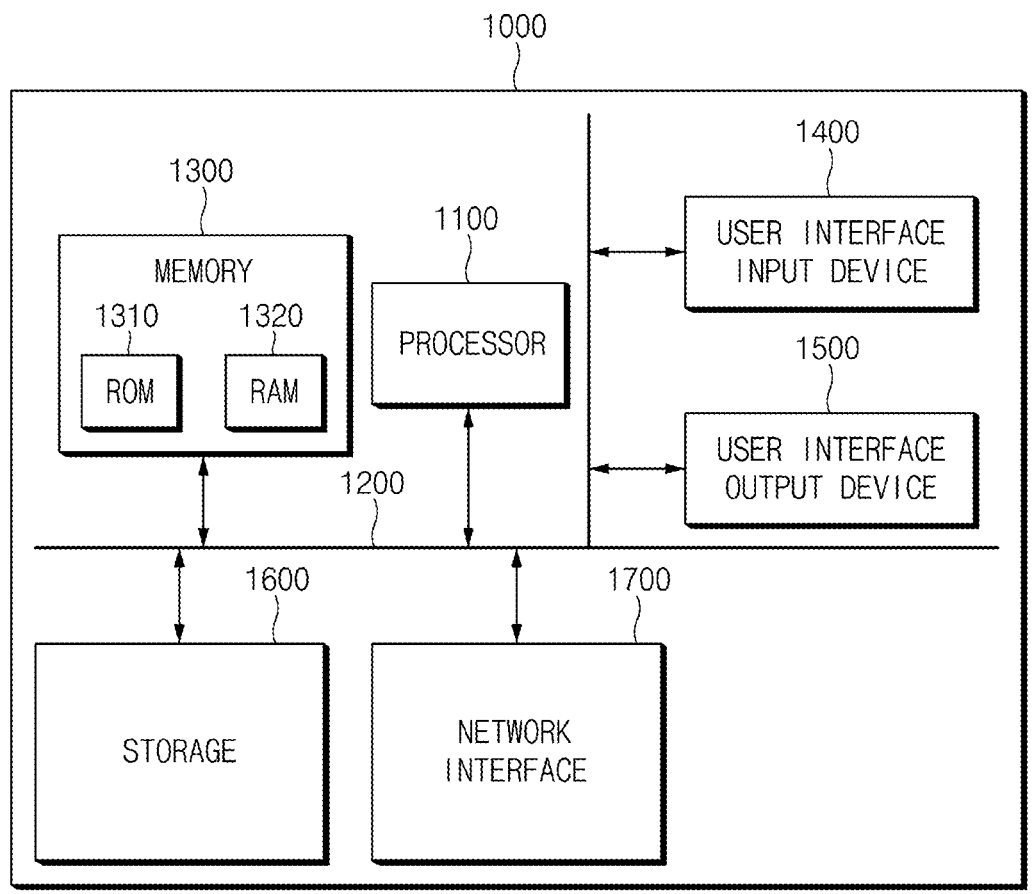
FIG. 10 illustrates a computing system according to an exemplary embodiment of the present disclosure.

FIG. 10 illustrates a computing system according to an exemplary embodiment of the present disclosure.

Referring to FIG. 10, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. An autonomous vehicle comprising
a processor configured to transmit a vehicle path to a control system and to request remote control when the remote control of the autonomous vehicle is required, to receive a corrected path obtained by correcting the vehicle path from the control system, to determine errors in reference point coordinates and path data of the corrected path, and to control the autonomous vehicle to follow the corrected path,
wherein the processor compares reference data, which is a previous path, with reference data of the vehicle path at the current position of the corrected path, and determines whether at least one of the route points of the reference data of the corrected path is lost,
wherein the processor compares the reference point coordinates of the corrected path received from the control system with reference point coordinates of a precision map of a current position of the autonomous vehicle transmitted to the control system from the autonomous vehicle.

2. The autonomous vehicle of claim 1, wherein
when the reference point coordinates of the corrected path and the reference point coordinates of the precision map of the current position of the autonomous vehicle do not match, or
when the reference data of the vehicle path and the reference data, which is the previous path, do not match at the current position of the corrected path,
the processor double-transforms the reference point coordinates of the corrected path into a precision map-based coordinate system.

3. The autonomous vehicle of claim 2, wherein the processor performs double transformation by transforming the reference point coordinates of the corrected path into a global coordinate system and then re-transforming it back into a current precision map coordinate system of the autonomous vehicle.

4. The autonomous vehicle of claim 2, wherein after the double transformation, when the reference point coordinates of the corrected path and the reference point coordinates of the precision map of the current position of the autonomous vehicle do not match, or when the reference data of the vehicle path and the reference data, which is the previous path, do not match at the current position of the corrected path, the processor requests corrected path retransmission from the control system.

5. The autonomous vehicle of claim 1, wherein when the reference point coordinates of the corrected path and the reference point coordinates of the precision map of the current position of the autonomous vehicle match, or when the reference data of the vehicle path and the reference data, which is the previous path, match at the current position of the corrected path, the processor determines whether the corrected path is drivable.

6. The autonomous vehicle of claim 5, wherein the processor determines whether driving of the corrected path is possible based on road information of the corrected path and vehicle surrounding information.

7. The autonomous vehicle of claim 5, wherein the processor notifies the control system that driving of the corrected path is possible when it is determined that the driving of the corrected path is possible, and receives a final driving signal from the control system.

8. The autonomous vehicle of claim 7, wherein when receiving the final driving signal from the control system, the processor determines whether the autonomous vehicle is stopped, and controls the autonomous vehicle to travel on the drivable corrected path when the autonomous vehicle is in a stopped state.

9. The autonomous vehicle of claim 8, wherein when the autonomous vehicle is in a drivable state, the processor updates a current position and a precision map of the autonomous vehicle, compares the reference point coordinates of the corrected path received together with the final driving signal from the control system and the reference point coordinates of the precision map of the current position of the autonomous vehicle, and compares reference data, which is a previous path, with reference data of the vehicle path at the current position of the corrected path.

10. The autonomous vehicle of claim 9, wherein depending on whether the reference point coordinates of the corrected path received together with the final driving signal from the control system match the reference point coordinates of the precision map of the current position of the autonomous vehicle and whether the reference data of the vehicle path and the reference data, which is the previous path, match at the current position of the corrected path, the processor double-transforms the reference point coordinates of the corrected path into a precision map-based coordinate system or controls the autonomous vehicle to follow the corrected path.

11. The autonomous vehicle of claim 1, wherein the reference data of the vehicle path and reference data of the corrected path each includes a number of path points that is predetermined without a change in positions of the path points as path information before a current position of the autonomous vehicle, and the vehicle path and the corrected path each includes a plurality of operator data capable of adjusting the positions of the path points in the control system as path information after the current position of the autonomous vehicle.

12. The autonomous vehicle of claim 11, wherein the processor determines whether a distance error occurs by comparing a distance between coordinate points of each of the path points of the vehicle path and coordinate points of each of the path points of the corrected path based on indexes of the path points of the vehicle path and the corrected path.

13. The autonomous vehicle of claim 11, wherein the processor compares a distance between coordinate points of each path point of the reference data of the vehicle path and coordinate points of each path point of the reference data of the corrected path, to determine whether the reference data of the corrected path matches the reference data of the vehicle path.

14. The autonomous vehicle of claim 1, further comprising:

a communication device configured to communicate with the control system; and a storage configured to store the corrected path received from the control system.

15. The autonomous vehicle of claim 14, wherein the processor generates the vehicle path based on a precision map coordinate system, and transmits the vehicle path and precision map-based reference point coordinates together when requesting the control system to perform remote control through the communication device.

16. The autonomous vehicle of claim 15, wherein the processor receives a corrected path that is corrected based on a same coordinate system as a precision map-based coordinate system of the autonomous vehicle from the control system through the communication device, and also receives reference point coordinates of the precision map of the corrected path.

17. A remote control method for an autonomous vehicle, comprising:

requesting, by a processor, remote control by transmitting a vehicle path to a control system when the remote control of the autonomous vehicle is required;

receiving, by the processor, a corrected path obtained by correcting the vehicle path from the control system;

determining, by the processor, errors in reference point coordinates and path data of the corrected path, and controlling the autonomous vehicle to follow the corrected path, wherein the determining of the errors in the reference point coordinates and the path data of the corrected path includes: comparing a reference data, which is a previous path, with reference data of the vehicle path at the current position of the corrected path, and determines whether at least one of the route points of the reference data of the corrected path is lost, wherein the determining of the errors in the reference point coordinates and the path data of the corrected path further includes:

comparing, by the processor, the reference point coordinates of the corrected path received from the control system with reference point coordinates of a precision map of a current position of the autonomous vehicle transmitted to the control system from the autonomous vehicle.

* * * * *